US011907023B2

(12) United States Patent
Takahashi

(10) Patent No.: US 11,907,023 B2
(45) Date of Patent: Feb. 20, 2024

(54) INFORMATION PROCESSING SYSTEM, INFORMATION PROCESSING APPARATUS, TERMINAL DEVICE, AND DISPLAY METHOD

(71) Applicant: Masato Takahashi, Tokyo (JP)

(72) Inventor: Masato Takahashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/659,711

(22) Filed: Apr. 19, 2022

(65) Prior Publication Data

US 2022/0342453 A1   Oct. 27, 2022

(30) Foreign Application Priority Data

Apr. 23, 2021 (JP) ................................. 2021-073477
Apr. 11, 2022 (JP) ................................. 2022-065259

(51) Int. Cl.
*G06F 1/16* (2006.01)

(52) U.S. Cl.
CPC .......... *G06F 1/1677* (2013.01); *G06F 1/1616* (2013.01); *G06F 1/1694* (2013.01); *G06F 2200/1637* (2013.01)

(58) Field of Classification Search
CPC ........... G06F 2200/1637; G06F 1/1694; G06F 1/1616; G06F 1/1677
See application file for complete search history.

(56) References Cited

U.S. PATENT DOCUMENTS

| | | | | | |
|---|---|---|---|---|---|
| 6,014,137 | A | * | 1/2000 | Burns | G06F 3/04842 715/788 |
| 9,983,628 | B2 | * | 5/2018 | Kim | G06F 3/0487 |
| 9,990,055 | B2 | * | 6/2018 | Seo | G06F 3/023 |
| 10,509,560 | B2 | * | 12/2019 | Kim | G06F 1/1643 |
| 10,817,243 | B2 | * | 10/2020 | Torii | G06F 3/1454 |
| 11,048,379 | B2 | * | 6/2021 | Cheong | G06F 3/0488 |
| 2002/0021278 | A1 | * | 2/2002 | Hinckley | G06F 3/04817 345/156 |

(Continued)

FOREIGN PATENT DOCUMENTS

| | | |
|---|---|---|
| JP | 2006-238289 | 9/2006 |
| JP | 2015-215650 | 12/2015 |
| WO | WO2015/190002 A1 | 12/2015 |

*Primary Examiner* — Justin S Lee
(74) *Attorney, Agent, or Firm* — IPUSA, PLLC

(57) ABSTRACT

An information processing system includes an information processing apparatus including a display and a terminal device to execute one or more applications. The information processing apparatus includes first circuitry to transmit a detection result indicating at least one of a posture, an inclination, and a bending angle of the display to the terminal device, receive layout information of the applications and content information of the applications from the terminal device, and display one or more windows of the applications on the display based on the layout information and the content information received from the terminal device. The terminal device includes second circuitry to determine, based on the detection result, a layout of the one or more windows of the applications corresponding to the detection result transmitted from the information processing apparatus to generate the layout information and transmit the layout information to the information processing apparatus.

15 Claims, 10 Drawing Sheets

(56) References Cited

U.S. PATENT DOCUMENTS

| | | | |
|---|---|---|---|
| 2008/0288610 A1* | 11/2008 | Isono | H04L 67/2895 709/219 |
| 2010/0060664 A1* | 3/2010 | Kilpatrick, II | G06F 1/1684 345/1.3 |
| 2011/0102314 A1* | 5/2011 | Roux | G06F 15/02 345/156 |
| 2012/0274656 A1* | 11/2012 | Kang | G06F 1/1632 345/619 |
| 2013/0321244 A1* | 12/2013 | Ono | G06F 3/1446 345/1.3 |
| 2014/0046699 A1* | 2/2014 | Fukatsu | G16H 10/60 705/3 |
| 2014/0078244 A1 | 3/2014 | Kitazawa et al. | |
| 2014/0111449 A1* | 4/2014 | Lee | G06F 3/041 345/173 |
| 2014/0203999 A1* | 7/2014 | Shim | G06F 3/0483 345/2.2 |
| 2014/0218266 A1* | 8/2014 | Chen | G06F 3/048 345/1.3 |
| 2015/0088669 A1* | 3/2015 | Kwak | G06F 16/9577 715/234 |
| 2016/0240164 A1* | 8/2016 | Chen | G09G 5/003 |
| 2017/0034474 A1 | 2/2017 | Goto et al. | |
| 2017/0034480 A1 | 2/2017 | Goto et al. | |
| 2017/0078616 A1 | 3/2017 | Uchiyama et al. | |
| 2017/0127020 A1 | 5/2017 | Takahashi et al. | |
| 2017/0358252 A1* | 12/2017 | Bhageria | G06F 21/84 |
| 2018/0018062 A1 | 1/2018 | Takahashi | |
| 2020/0379707 A1* | 12/2020 | Kwon | G06F 3/1454 |
| 2021/0263564 A1* | 8/2021 | Chen | H04N 21/4438 |
| 2022/0300236 A1* | 9/2022 | Baijal | G03B 21/14 |

* cited by examiner

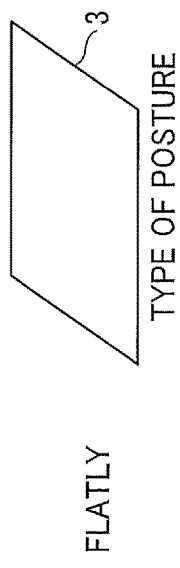
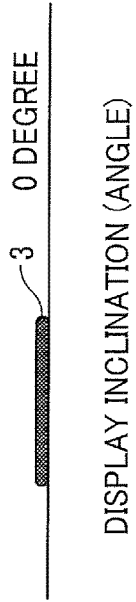
FIG. 6A  FLATLY / TYPE OF POSTURE / 0 DEGREE / DISPLAY INCLINATION (ANGLE)
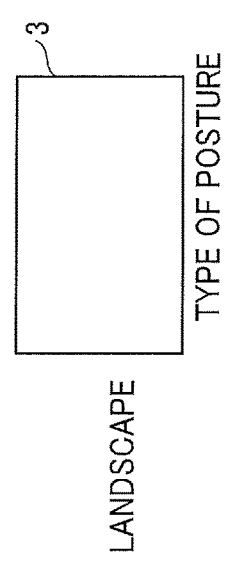
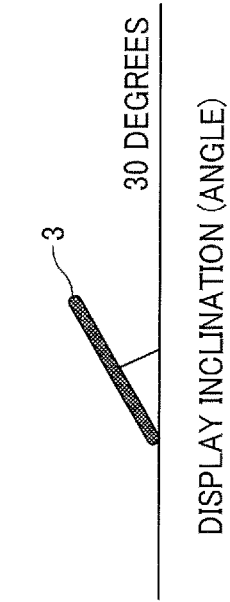
FIG. 6B  LANDSCAPE / TYPE OF POSTURE / 30 DEGREES / DISPLAY INCLINATION (ANGLE)
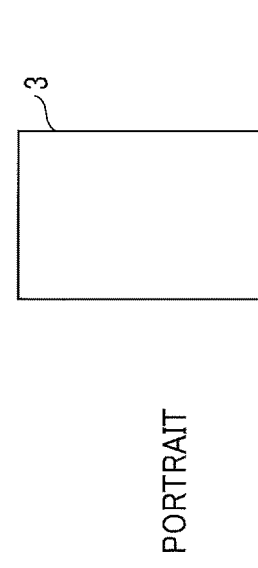
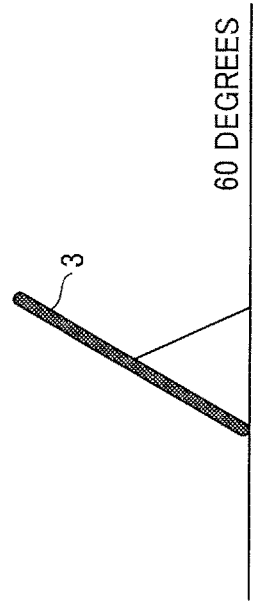
FIG. 6C  PORTRAIT / TYPE OF POSTURE / 60 DEGREES / DISPLAY INCLINATION (ANGLE)
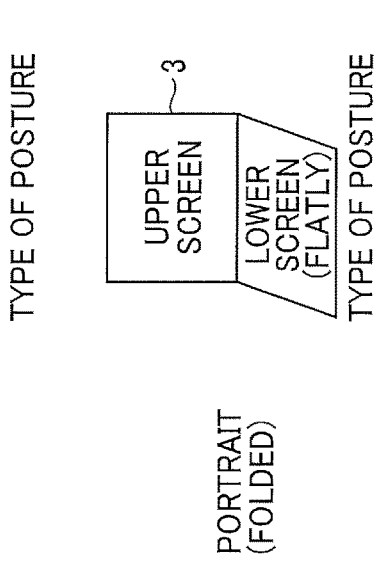
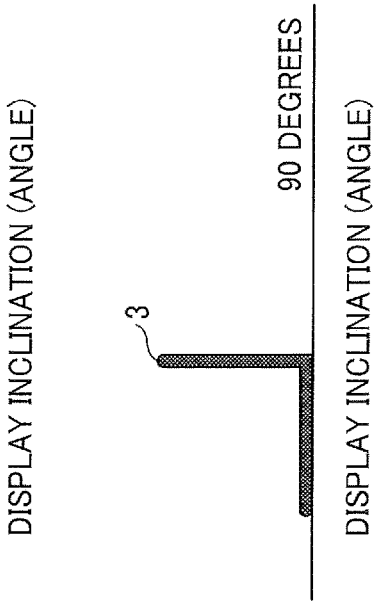
FIG. 6D  PORTRAIT (FOLDED) / TYPE OF POSTURE / 90 DEGREES / DISPLAY INCLINATION (ANGLE)

FIG. 7

| POSTURE | DISPLAY INCLINATION (ANGLE) | APPLICATION WINDOW (NUMBER OF SCREENS) | MAIN SCREEN | SUB SCREEN A | SUB SCREEN B | SETTING NAME |
|---|---|---|---|---|---|---|
| FLATLY | 0 DEGREE | 1 | VIDEO CONFERENCE APPLICATION | WHITEBOARD APPLICATION | | SETTING A |
| PORTRAIT | 90 DEGREES | 1 | MAIL APPLICATION | WEB BROWSER | | |
| | 60 DEGREES | 2 | MAIL APPLICATION | VIDEO CONFERENCE APPLICATION | WEB BROWSER | SETTING C |
| | 30 DEGREES | 1 | VIDEO CONFERENCE APPLICATION | WHITEBOARD APPLICATION | | |
| | 90 DEGREES | 2 | MAIL APPLICATION | DOCUMENT DISPLAY APPLICATION | WEB BROWSER | SETTING B |
| LANDSCAPE | 60 DEGREES | 2 | DOCUMENT DISPLAY APPLICATION | WEB BROWSER | MAIL APPLICATION | SETTING D |
| | 30 DEGREES | 1 | VIDEO CONFERENCE APPLICATION | WHITEBOARD APPLICATION | | |
| PORTRAIT (FOLDED) | 90 DEGREES (UPPER SCREEN) | 2 | VIDEO CONFERENCE APPLICATION | WEB BROWSER | WHITEBOARD APPLICATION | |
| | 60 DEGREES (UPPER SCREEN) | 2 | WEB BROWSER | VIDEO CONFERENCE APPLICATION | WHITEBOARD APPLICATION | |
| | 30 DEGREES (UPPER SCREEN) | 2 | VIDEO CONFERENCE APPLICATION | WHITEBOARD APPLICATION | WHITEBOARD APPLICATION | |

INFORMATION PROCESSING SYSTEM, INFORMATION PROCESSING APPARATUS, TERMINAL DEVICE, AND DISPLAY METHOD

CROSS-REFERENCE TO RELATED APPLICATIONS

This patent application is based on and claims priority pursuant to 35 U.S.C. § 119(a) to Japanese Patent Application Nos. 2021-073477, filed on Apr. 23, 2021, and 2022-065259, filed on Apr. 11, 2022, in the Japan Patent Office, the entire disclosure of which is hereby incorporated by reference herein.

BACKGROUND

Technical Field

The present disclosure relates to an information processing system, an information processing apparatus, a terminal device, and a display method.

Related Art

There are known information processing apparatuses that include a display, such as a liquid crystal display or a plasma display, having a touch panel and display an image received from a terminal device on the display.

There has been known a technique in which an image to be displayed by such an information processing apparatus is changed in accordance with a posture of a display of the information processing apparatus. There has been also known a configuration to receive status information including an arrangement direction of a display from an external device, rotate an image to be displayed on the display, and transmit image data to the external device.

SUMMARY

In one aspect, an information processing system includes an information processing apparatus including a display and a terminal device to execute one or more applications. The information processing apparatus includes first circuitry to transmit a detection result indicating at least one of a posture, an inclination, and a bending angle of the display to the terminal device, receive layout information of the applications and content information of the applications from the terminal device, and display one or more windows of the applications on the display based on the layout information and the content information received from the terminal device. The terminal device includes second circuitry to determine, based on the detection result, a layout of the one or more windows of the applications corresponding to the detection result transmitted from the information processing apparatus to generate the layout information and transmit the layout information to the information processing apparatus.

In another aspect, an information processing apparatus includes a display and circuitry to transmit a detection result indicating at least one of a posture, an inclination, and a bending angle of the display to a terminal device capable of executing one or more applications, receive layout information of the applications determined based on the detection result transmitted from the terminal device and content information of the applications, and display one or more windows of the applications on the display based on the layout information and the content information received from the terminal device.

In another aspect, a terminal device includes circuitry to execute one or more applications, determine, based on a detection result indicating at least one of a posture, an inclination, and a bending angle of a display of an information processing apparatus received from the information processing apparatus, a layout of one or more windows of the applications corresponding to the detection result transmitted from the information processing apparatus to generate layout information, and transmit the layout information and content information of the applications to the information processing apparatus.

In another aspect, a display method performed by an information processing apparatus that displays a screen on a display. The method includes transmitting a detection result indicating at least one of a posture, an inclination, and a bending angle of the display to a terminal device capable of executing one or more applications, receiving layout information of the applications corresponding to the detection result transmitted from the terminal device and content information of the applications, and displaying one or more windows of the applications on the display based on the layout information and the content information.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 6A, 6B, 6C, and 6D are diagrams illustrating examples of a type of posture of the electronic information board and an inclination (angle) of a display of the electronic information board according to one embodiment of the present disclosure;

FIG. 7 is a table illustrating an example of a window layout table used for arranging application windows according to one embodiment of the present disclosure;

Figure 1:
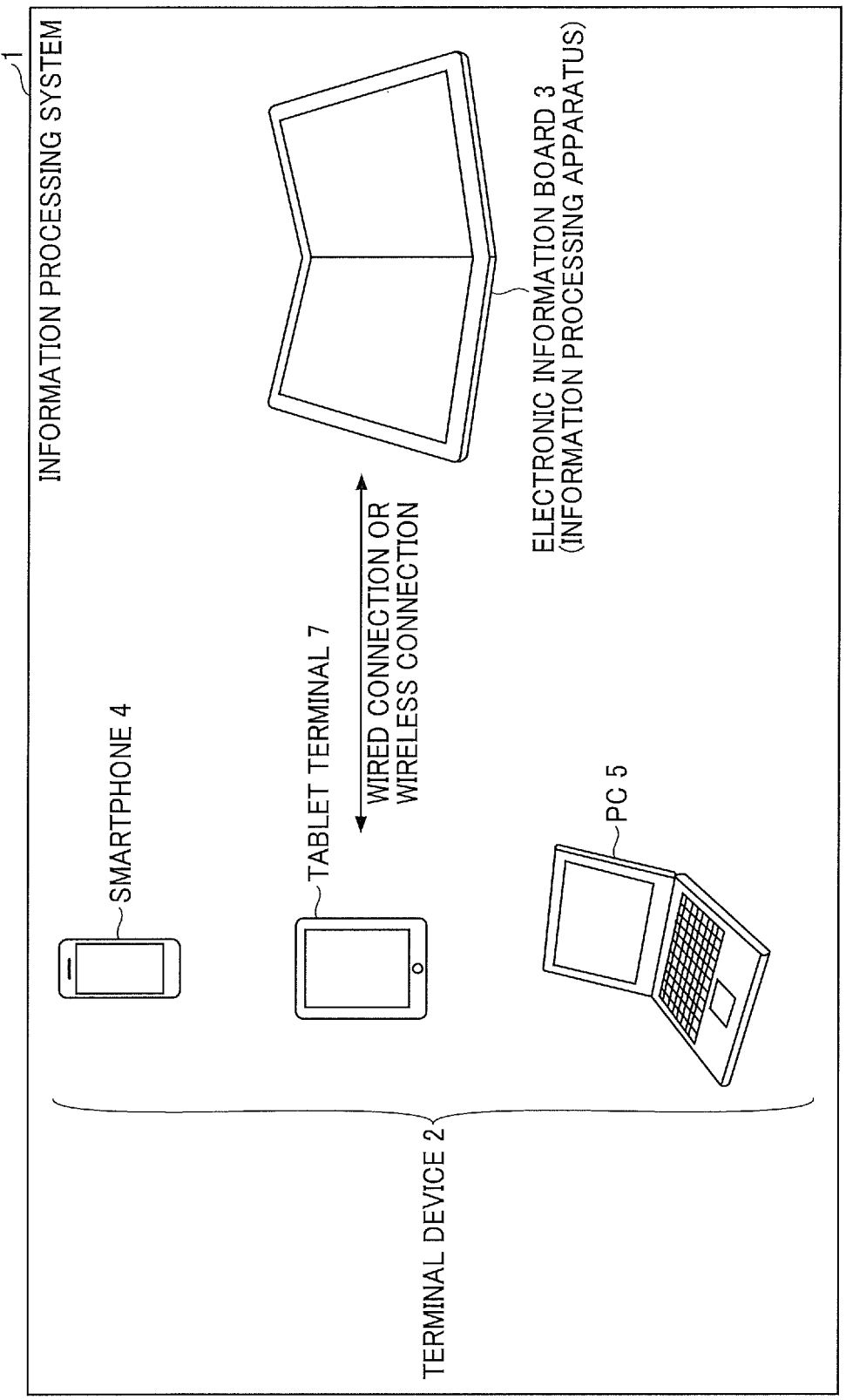
FIG. 1 is a diagram illustrating an example of a configuration of an information processing system according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a," "an," and "the" are intended to include the plural forms as well, unless the context clearly indicates otherwise.

Hereinafter, descriptions are given of an information processing system, an information processing apparatus, a terminal device, and a display method according to embodiments of the present disclosure with reference to the drawings.

First Embodiment

In the present embodiment, a window layout table used for arranging application windows in accordance with a posture, an inclination, or a bending angle of a display is set in advance. A terminal device determines a layout of application windows on the display by referring to the window layout table according to the posture, inclination, or bending angle of the display. Thus, an electronic information board displays the application windows in appropriate sizes and display modes.

In addition, a user can easily change contents of the window layout table.

System Configuration

In recent years, there are known information processing apparatuses including a display, such as a liquid crystal display or a plasma display, having a touch panel. Such an information processing apparatus is called an electronic information board. Taking advantage of a flexible shape of a recent display, a display in a form bendable (curved), rollable (wound), or foldable (folded) has started to be used for the electronic information board.

The present embodiment provides a technique for automatically arranging application windows in accordance with a form of a display that varies in shape. Note that, in this disclosure, a window (an application window) is displayed for each application on a screen and a display is a device that displays an entire area of the screen.

In the present embodiment, using an electronic information board having a foldable display, a description is given of a method of arranging application windows in a case where the display is folded as an example.

FIG. 1 is a diagram illustrating an example of a configuration of an information processing system 1 according to a first embodiment of the present disclosure. The information processing system 1 includes a personal computer (PC) 5, a smartphone 4, a tablet terminal 7, and an information processing apparatus such as an electronic information board 3. The PC 5 includes a general-purpose wired interface such as a universal serial bus (USB) type-c or a general-purpose wireless interface such as WIRELESS FIDELITY (WI-FI). The electronic information board 3 is connected to the PC 5, the smartphone 4, and the tablet terminal 7 by wire or wirelessly. The PC 5, the smartphone 4, and the tablet terminal 7 are collectively referred to as a terminal device 2. The terminal device 2 controls the electronic information board 3 connected to the terminal device 2.

The electronic information board 3 may be a touch panel display. Hereinafter, it is assumed that the PC 5 is connected to the electronic information board 3.

The electronic information board 3 transmits information such as a displayable size and a posture, an inclination, and a bending angle of a display to the terminal device 2. Based on the information received from the electronic information board 3, the terminal device 2 determines a layout of application windows to be displayed on the terminal device 2 and the electronic information board 3, and transmits data of the application window to be displayed on the electronic information board 3 to the electronic information board 3. The layout of application windows is, for example, information indicating a position and a size of an application window in a case where a window of at least one application to be executed by the terminal device 2 is displayed on the terminal device 2 or the electronic information board 3. Hereinafter, the layout of application windows may be referred to as "layout information."

Hardware Configuration of Terminal Device

Figure 2:
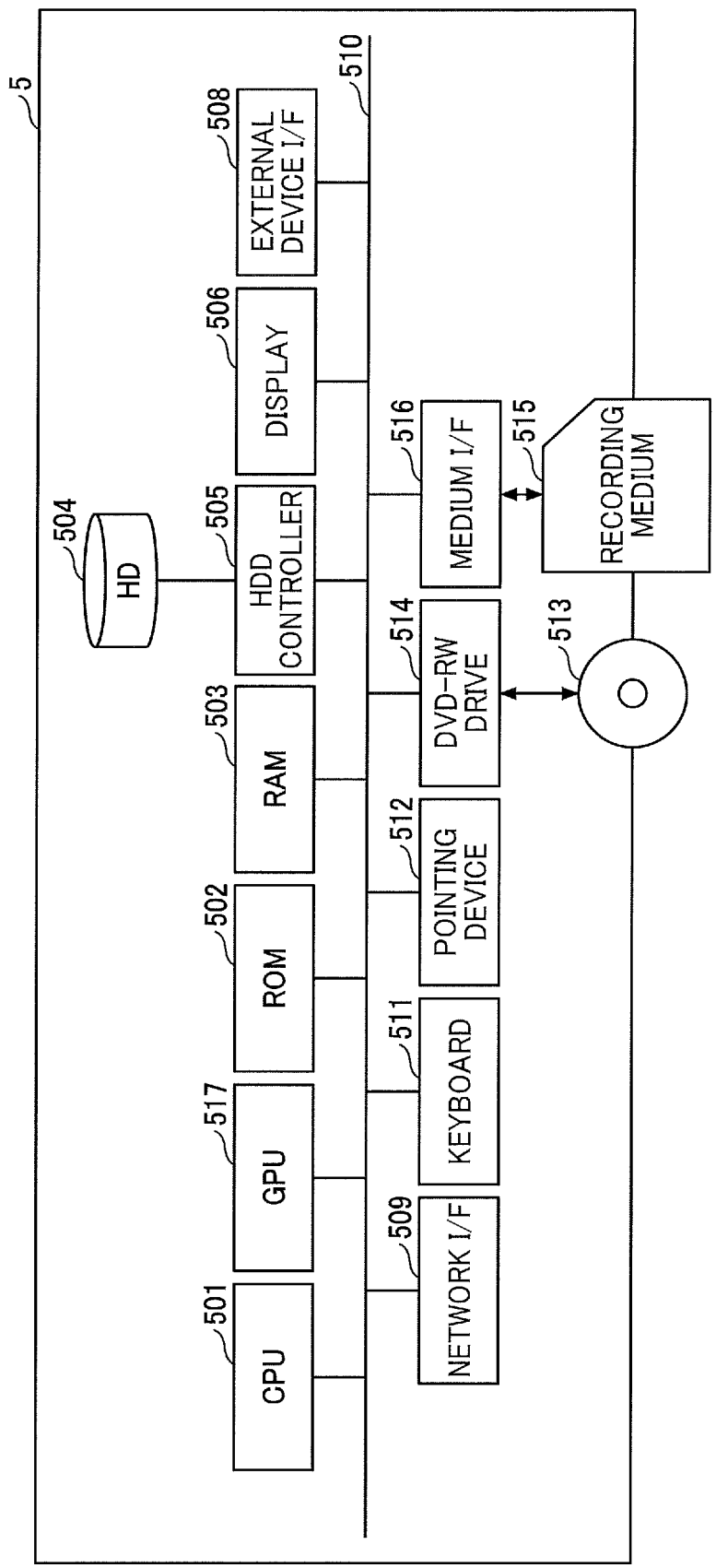
FIG. 2 is a block diagram illustrating an example of a hardware configuration of a terminal device according to the first embodiment of the present disclosure.

FIG. 2 is a block diagram illustrating a hardware configuration of the PC 5 that is an example of the terminal devices 2 according to the present embodiment. A description is given of the hardware configuration of the PC 5 with reference to FIG. 2.

As illustrated in FIG. 2, the PC 5 is implemented by a computer and includes a central processing unit (CPU) 501, a graphics processing unit (GPU) 517, a read only memory (ROM) 502, a random access memory (RAM) 503, a hard disk (HD) 504, a hard disk drive (HDD) controller 505, a display 506, an external device interface (I/F) 508, one or more network I/Fs 509, a data bus 510, a keyboard 511, a pointing device 512, a DVD-RW drive 514, and a medium I/F 516. The hardware configuration of the PC 5 illustrated in FIG. 2 is an example. The PC 5 may omit some of the components illustrated in FIG. 2 or include one or more components.

The CPU 501 controls entire operation of the PC 5. The GPU 517 performs image processing or processing related to screen control. The ROM 502 stores programs such as an initial program loader (IPL) to boot the CPU 501. The RAM 503 is used as a work area for the CPU 501. The HD 504 stores various data such as programs. The HDD controller 505 controls reading and writing of various data from and to the HD 504 under control of the CPU 501. The display 506 displays various information such as a cursor, a menu, a window, characters, or an image. The external device I/F 508 is an interface for connection with various external devices. Examples of the external devices include, but not limited to, a USB memory and a printer. The network I/F 509 is an interface for performing data communication via a communication network. The data bus 510 is an address bus, a data bus, or the like that electrically connects each component illustrated in FIG. 2 such as the CPU 501.

The keyboard 511 is a kind of input device including a plurality of keys for inputting a character, a numerical value, various instructions, and the like. The pointing device 512 is a kind of input device that selects and executes various instructions, selects a processing target, and moves a cursor. The DVD-RW drive 514 controls reading and writing of various data from and to a DVD-RW 513, which is an example of a removable recording medium. The removable recording medium is not limited to a DVD-RW and may be a digital versatile disc recordable (DVD-R) or the like. The medium I/F 516 controls reading and writing (storing) of data from and to a recording medium 515 such as a flash memory.

Hardware Configuration of Electronic Information Board

Figure 3:
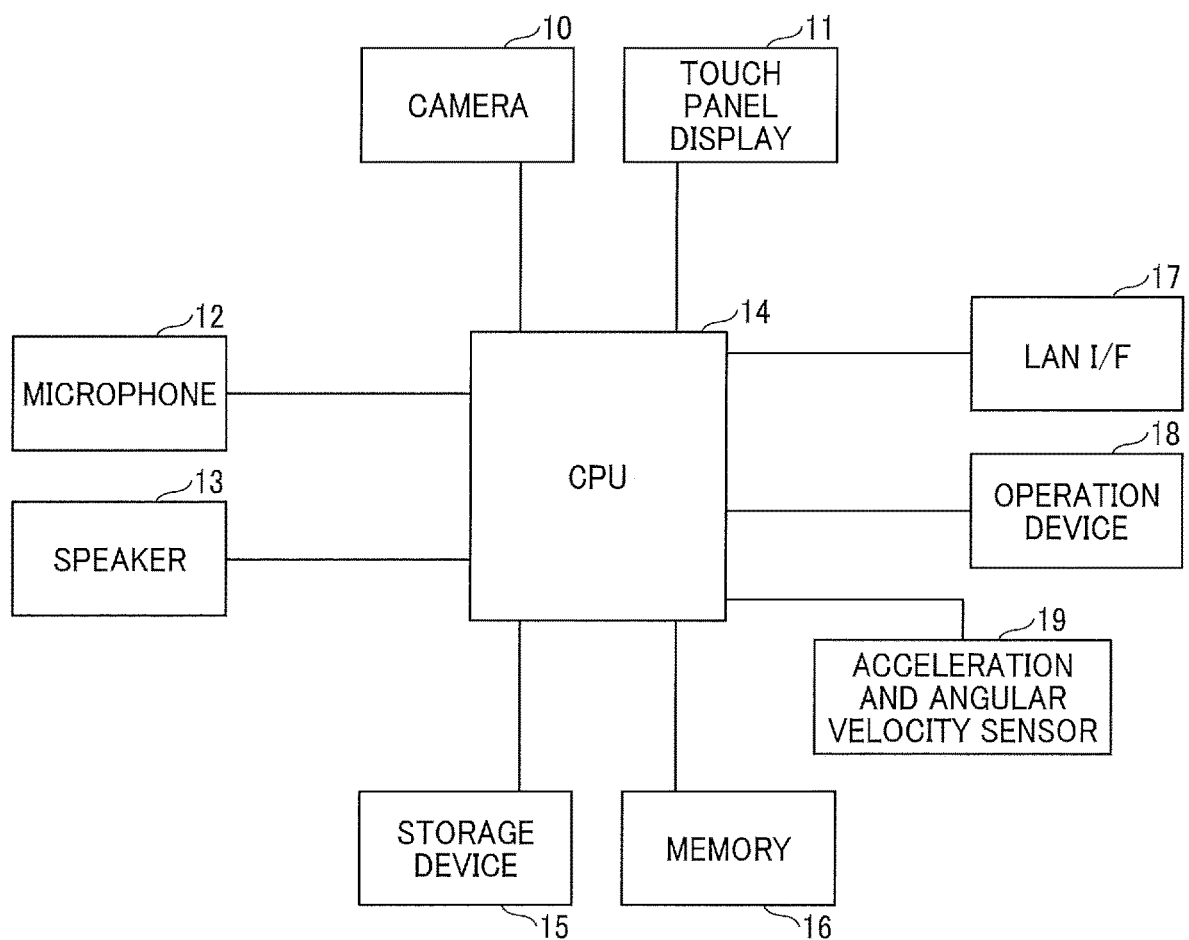
FIG. 3 is a block diagram illustrating an example of a hardware configuration of an electronic information board according to the first embodiment of the present disclosure.

FIG. 3 is a block diagram illustrating an example of a hardware configuration of the electronic information board 3 according to the present embodiment. The electronic information board 3 includes a camera 10, a touch panel display 11, a microphone 12, a speaker 13, a CPU 14, a storage device 15, a memory 16, a local area network (LAN) I/F 17, an operation device 18, and an acceleration and angular velocity sensor 19.

The camera 10 acquires a surrounding image as a moving image and transmits the data of the moving image to the CPU 14.

The touch panel display 11 displays the moving image of the data received from the CPU 14 on a screen and, by transmitting a coordinate of a position touched by a user with a finger or a pen to the CPU 14, implements device control. A touch panel used in the touch panel display 11 is, for example, a capacitive touch panel integral with a display. The touch panel display 11 may be simply referred to as a display or a screen.

The CPU 14 has functions of controlling entire operation of the electronic information board 3, controlling a video conference, processing moving image data acquired by the camera 10 which may have a visual field of 360 degrees, processing audio data acquired by the microphone 12, and processing drawing data acquired by the touch panel display 11. In addition, the CPU 14 has a function of coder and decoder (codec) to encode the moving image data, audio data, and drawing data to be transmitted to the LAN I/F 17 and decode moving image data, audio data, and drawing data received from the LAN I/F 17 to be transmitted to the touch panel display 11 or the speaker 13. Examples of a format of the codec used by CPU 14 include h.264/advanced video coding (AVC), h.264/scalable video coding (SVC), and h.265.

The microphone 12 acquires voice of a user participating in a video conference and transmits the voice data to the CPU 14. The microphone 12 is fixedly mounted at a specific position of the electronic information board 3.

The speaker 13 outputs audio data received from the CPU 14 as audio sound.

The storage device 15 stores programs for the CPU 14 to control devices, a video conference, and the like. Examples of the storage device 15 include a non-volatile storage medium such as a flash memory and an HDD.

The memory 16 stores expanded programs to be executed by the CPU 14 and temporarily stores calculation data. Examples of the memory 16 include a volatile memory such as a double data rate (DDR) memory.

The LAN I/F 17 is connected to other terminal devices participating in a video conference via the Internet or the like to transmit and receive image data and audio data. Examples of the LAN I/F 17 include a wired LAN to be connected to ETHERNET in compliance with a standard of 10 BASE-T, 100 BASE-T, or 1000 BASE-T, and a wireless LAN in compliance with a standard of an institute of electrical and electronics engineers (IEEE) 802.11ac, IEEE 802.11a, IEEE 802.11b, IEEE 802.11g, or IEEE 802.11n.

The operation device 18 includes a keyboard, buttons, and the like, and allows a user to perform device control of the electronic information board 3.

The acceleration and angular velocity sensor 19 (a combination of a triaxial gyroscope and a triaxial accelerometer) detects a posture and an inclination of the touch panel display 11. In a case where the touch panel display 11 is foldable, the acceleration and angular velocity sensor 19 detects a bending angle of the upper display of the touch panel display 11.

Functions

Figure 4:
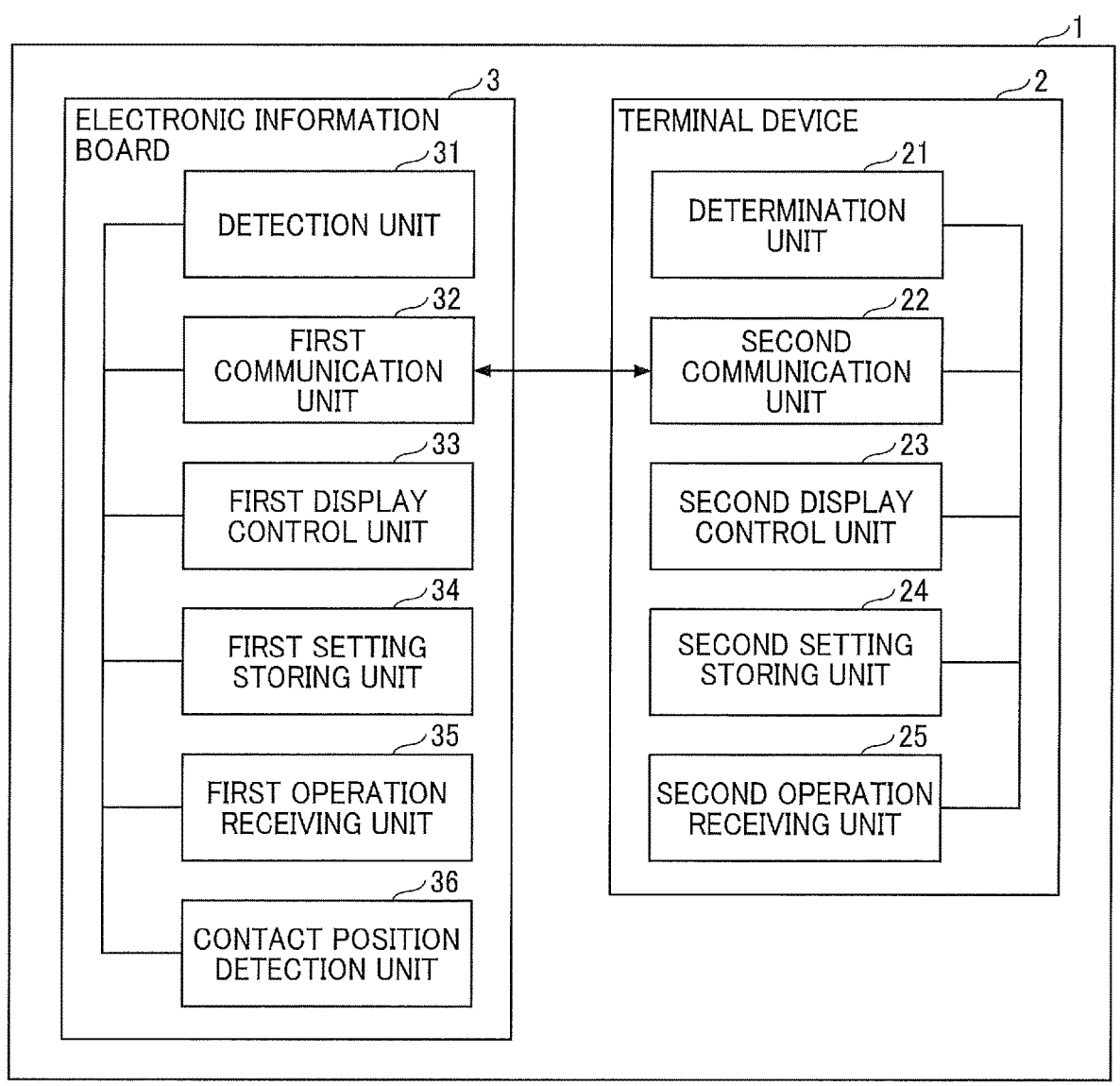
FIG. 4 is a block diagram illustrating an example of a functional configuration of the information processing system according to the first embodiment of the present disclosure.

A description is given below of a functional configuration of the information processing system 1 according to the present embodiment with reference to FIG. 4. FIG. 4 is a block diagram illustrating an example of the functional configuration of the information processing system 1 according to the present embodiment.

The electronic information board 3 includes a detection unit 31, a first communication unit 32, a first display control unit 33, a first setting storing unit 34, a first operation receiving unit 35, and a contact position detection unit 36. The individual functional units are functions or units implemented by the CPU 14 executing instructions included in one or more programs or applications installed in the electronic information board 3.

The terminal device 2 includes a determination unit 21, a second communication unit 22, a second display control unit 23, a second setting storing unit 24, and a second operation receiving unit 25. The individual functional units are functions or units implemented by the CPU 501 or the GPU 517 executing instructions included in one or more programs or applications installed in the terminal device 2. In particular, processing of images to be displayed on a screen and processing of the layout of application windows are performed by the GPU 517.

The detection unit 31 detects the posture, inclination, and bending angle of the touch panel display 11 of the electronic information board 3 and transmits the detection result (information indicating at least one of the posture, inclination, and bending angle) to the first communication unit 32.

The first communication unit 32 transmits the detection result received from the detection unit 31 to the second communication unit 22 of the terminal device 2.

In addition, the first communication unit 32 acquires information on whether or not to automatically perform the window layout from the first setting storing unit 34. In a case where the information indicates automatically performing the window layout, the first communication unit 32 transmits a request for automatically performing the window layout to the second communication unit 22. Alternatively, the first communication unit 32 may transmit the information on whether or not to automatically perform the window layout. In a case where the information indicates not automatically performing the window layout, the first communication unit 32 may not transmit the request or the information to the second communication unit 22.

Further, the first communication unit 32 receives the layout information and window content information of an application window to be displayed on the touch panel display 11 from the second communication unit 22, and transmits the layout information and the window content information to the first display control unit 33. The window content information represents an image to be displayed in an application window on the touch panel display 11 based on a content of the application. For example, the window content information indicates any content to be displayed in the application window, such as an image, which may be expressed in pixel with the three primary colors of red, green, and blue (RGB).

The first display control unit 33 displays an image on the touch panel display 11 based on the layout information and the window content information received from the first communication unit 32.

The first setting storing unit 34 stores the information on whether or not to automatically perform the window layout. This information may be stored in the second setting storing unit 24 of the terminal device 2.

The first operation receiving unit 35 receives an input operation by a user via the touch panel display 11 or the like. For example, the first operation receiving unit 35 receives an input operation by the user relating to automatically performing the window layout and transmits setting information input by the user to the first setting storing unit 34. The first setting storing unit 34 stores the setting information.

The contact position detection unit 36 detects coordinates of a position which is contacted by an input device (input means), such as a pen or a fingertip, on the touch panel display 11. The contact position detection unit 36 interpolates and connects the contact coordinates into a coordinate point sequence, to generate stroke data.

The determination unit 21 determines a layout of one or more application windows based on the detection result on the posture, inclination, and bending angle of the touch panel display 11 of the electronic information board 3 detected by the detection unit 31 of the electronic information board 3 and a window layout table 40 acquired from the second setting storing unit 24, and generates layout information. Alternatively, the determination unit 21 may receive the layout information input to the second operation receiving unit 25 by a user from the second operation receiving unit 25 and determine the received layout information to be final layout information. Furthermore, the determination unit 21 transmits the determined layout information to the second display control unit 23.

The second communication unit 22 receives, from the first communication unit 32 of the electronic information board 3, the request for automatically performing the window layout or the information on whether or not to automatically perform the window layout, and the information on the posture, inclination, and bending angle of the touch panel display 11, and transmits the request and the information to the determination unit 21. In addition, the second communication unit 22 transmits the window content information received from the second display control unit 23 to the first communication unit 32.

The second display control unit 23 displays, based on the layout information received from the determination unit 21, an image on the display 506 and transmits the window content information representing an image to be displayed on the touch panel display 11 of the electronic information board 3 to the second communication unit 22.

The second setting storing unit 24 stores the window layout table 40 received from the second operation receiving unit 25. In addition, the second setting storing unit 24 transmits the window layout table 40 to the determination unit 21 or the like in response to a request received therefrom.

The second operation receiving unit 25 receives a request for changing the window layout table 40 in accordance with a user operation via the keyboard 511 or the pointing device 512 and transmits the changed window layout table 40 to the second setting storing unit 24. The second setting storing unit 24 stores the changed window layout table 40. Similarly, the second operation receiving unit 25 receives an input newly to the layout information and transmits the newly input layout information to the determination unit 21.

Figure 5:
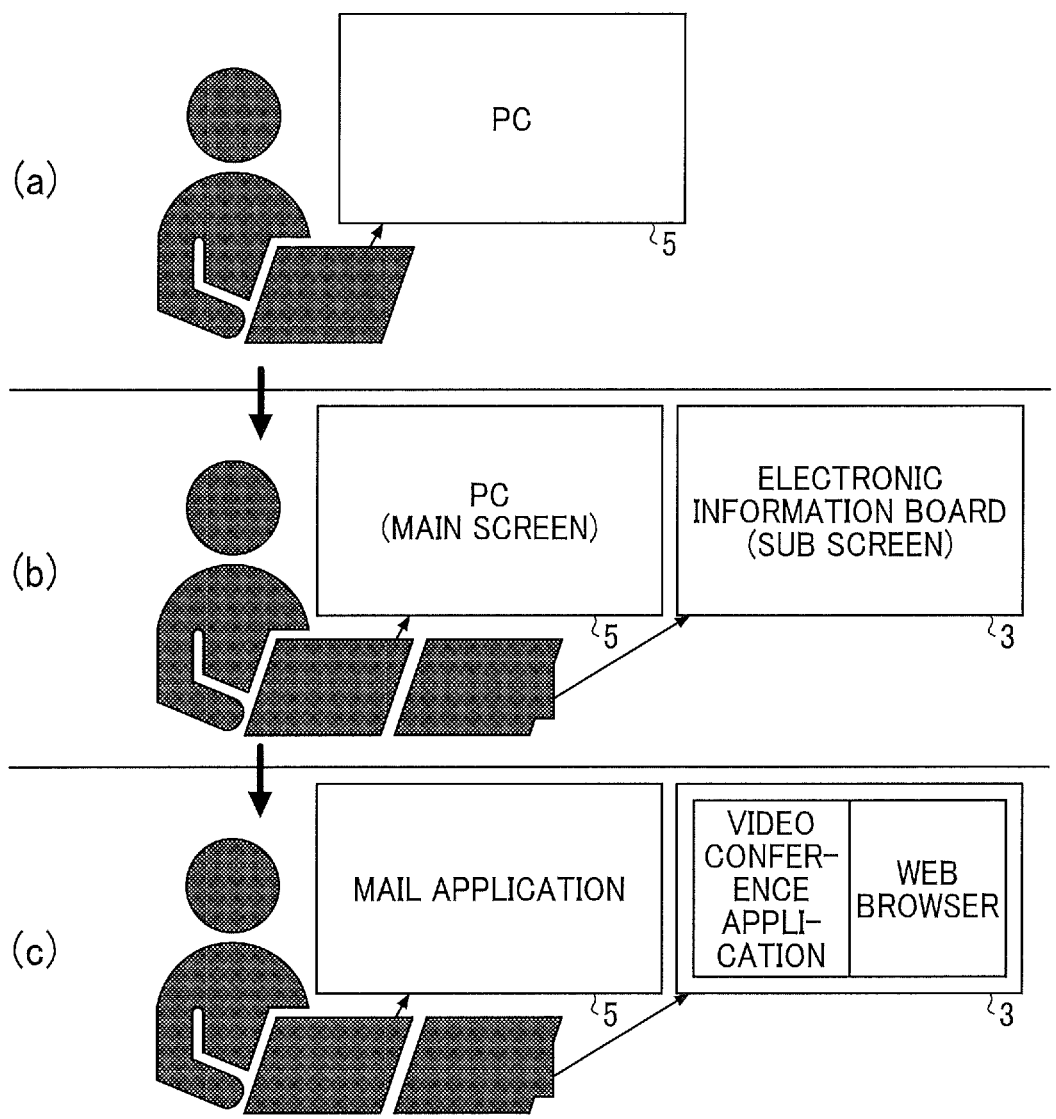
FIG. 5 is a diagram illustrating an example of a relationship between a main screen and a sub screen according to one embodiment of the present disclosure.

A description is now given of a relationship between a main screen and a sub screen with reference to FIG. 5. In a state (a) of FIG. 5, a user uses only the PC 5, and the electronic information board 3 is not connected to the PC 5. In a state (b) of FIG. 5, the electronic information board 3 is connected to the PC 5 by the user. In such a case, the display of the PC 5 is referred to as a main screen and the screen of the electronic information board 3 is referred to as a sub screen. In a state (c) of FIG. 5, application windows are automatically arranged on the individual screens in a layout suitable for the posture (landscape) of the touch panel display 11 of the electronic information board 3 in the state (b) of FIG. 5.

A description is now given of a type of posture of the electronic information board 3 that is foldable and an inclination of the display of the electronic information board 3 with reference to FIGS. 6A, 6B, 6C, and 6D. FIGS. 6A, 6B, 6C, and 6D illustrate states in which the electronic information board 3 is set in different postures, which are referred to as flatly, landscape, portrait, and portrait (folded), respectively. Hereinafter, the electronic information board 3 that is foldable may be referred to as an "electronic information board 3 (foldable)."

As illustrated in FIG. 6A, in the case of the flatly posture, the inclination of the screen is not adjusted, and the inclination (angle) of the screen is 0 degree with respect to the horizontal direction. As illustrated in FIGS. 6B and 6C, the inclination of the screen of the display can be adjusted by adjusting a tilt angle of a stand supporting the main body of the electronic information board 3 at the landscape posture and the portrait posture. In FIG. 6B, the inclination (angle) of the display at the landscape posture is 30 degrees with respect to the horizontal direction. In FIG. 6C, the inclination (angle) of the display at the portrait posture is 60 degrees with respect to the horizontal direction.

As illustrated in FIG. 6D, the electronic information board 3 is flatly placed at the portrait (folded) posture with the lower half kept flatly and the upper half folded at the center line of the longitudinal direction of the electronic information board 3. The user adjusts the bending angle of the upper half to set an inclination (angle) of the upper half of the display. In FIG. 6D, the inclination (angle) of the upper half of the display at the portrait (folded) posture is 90 degrees with respect to the horizontal direction.

An example of an optimal layout of application windows on the electronic information board 3 (foldable) is described, assuming that the electronic information board 3 (foldable) at the portrait (folded) posture of FIG. 6D is connected to the PC 5. In this case, the PC 5 displays a window of a video conference application on the screen of the PC 5 and causes the electric information board 3 (foldable) to display windows of a presentation application and a whiteboard application on the upper half and the lower half of the electronic information board 3 (foldable), respectively. The whiteboard application is an application that allows a user to handwrite notes on a touch panel display. At this point, for example, it is assumed that the posture of the electronic information board 3 (foldable) is changed to a flatly posture. The electronic information board 3 (foldable) arranges the window of the whiteboard application on the entire area of the display of the electronic information board 3 (foldable) in response to an instruction from the PC 5, and the PC 5 divides the screen of the PC 5 into two areas to arrange the windows of the video conference application and the presentation application on the different areas.

The posture specific to such a foldable display and the inclination of the display are detected by the detection unit 31, for example, using the acceleration and angular velocity sensor 19. The bending angle of the upper half is detected by using a sensor provided at the folded portion. Alternatively, the bending angle of the upper half may be detected by a triaxial gyroscope. Furthermore, an accelerometer may be arranged on each of the upper half and the lower half of the electronic information board 3 (see FIG. 6D), and a difference between the angles of the two accelerometers with respect to the direction of gravity may be used as the bending angle. In FIG. 6D, since the angles with respect to the direction of gravity of the upper half and the lower half are 90 degrees and 0 degree, respectively, the bending angle is 90 degrees. Note that the bending angle detected by the detection unit 31 does not have to be strictly accurate, and the bending angle may have a range, for example, in increments of 5 degrees. In addition, as a folding type of the display, a landscape (folded) posture may be used instead of the portrait (folded) posture illustrated in FIG. 6D.

The electronic information board 3 transmits the detection result to the PC 5 (or the smartphone 4 or the tablet terminal 7). In response to receiving the detection result, the PC 5 determines the layout of the application window based on the window layout table 40 prepared in advance, storing information on how application windows are arranged. In a case where any applications corresponding to the window layout table 40 are not activated, the PC 5 may activate the applications whose windows to be displayed.

FIG. 7 is a table illustrating an example of the window layout table 40 used for arranging an application window according to the present embodiment. In this example, the window layout table 40 is used in a case where the electronic information board 3 (foldable) is connected to the PC 5. The window layout table 40 associates the detection result (information indicating at least one of the posture, inclination, and bending angle) detected by the detection unit 31 with a destination where an application window is arranged and is used to arrange an individual window of one or more applications in a different area on a display. In other words, the window layout table 40 associates the detection result with the layout information.

The "POSTURE" indicates a way of placing the touch panel display 11 of the electronic information board 3 detected by the detection unit 31. The posture is an example of the detection result.

The "DISPLAY INCLINATION (ANGLE)" indicates an inclination of the touch panel display 11 of the electronic information board 3 detected by the detection unit 31 and is an angle of the touch panel display 11 with respect to the horizontal direction. Note that the angle does not have to be a fixed value, and may be set in a range, for example, from 25 degrees to 35 degrees. The display inclination is an example of the detection result.

The "APPLICATION WINDOW (NUMBER OF SCREENS)" indicates the number of screens on which individual windows of one or more applications are arranged on the electronic information board 3. In a case of one screen, a window of one application is displayed on the entire area of the touch panel display 11 of the electronic information board 3. In a case of two screens, the entire area of the touch panel display 11 is divided into two areas in which windows of two applications are individually displayed. That is, the windows of the applications are displayed in one or more areas of the touch panel display 11 that may differ depending on the case of one screen and the case of two screens. The "APPLICATION WINDOW (NUMBER OF SCREENS)" can thus indicate a size of an area of an application window.

The "MAIN SCREEN" indicates an application whose window to be displayed on the display 506 of the PC 5.

The "SUB SCREEN A" indicates a first application whose window to be displayed on the touch panel display 11 of the electronic information board 3. The "SUB SCREEN A" and a "SUB SCREEN B" described below define a layout (position) of an application window on the touch panel display 11.

The "SUB SCREEN B" indicates a second application whose window to be displayed on the touch panel display 11 of the electronic information board 3. The "SUB SCREEN B" is set only when the "APPLICATION WINDOW (NUMBER OF SCREENS)" indicates two screens. In the case of a foldable display having a folding line along which the display is bendable, the folding line may be a border (boundary) between the sub screen A and the sub screen B. For example, the sub screen A and the sub screen B are arranged in different areas on the touch panel display 11 indicated by coordinates of diagonal vertices on the touch panel display 11 on which respective diagonal vertices of the sub screen A and the sub screen B are arranged. The sub screen A and the sub screen B can thus define a layout (position) and a size of an application window.

The "SETTING NAME" indicates a name of a window layout setting displayed by an application that receives contents of the window layout setting.

The contents of the window layout setting of the window layout table 40 are managed by an application (referred to as a "screen control application") resident in the PC 5. A user can check or change the contents of the window layout setting at any time. For example, a layout of an application window may be automatically performed at a timing when the electronic information board 3 is connected to the PC 5, or may be manually performed by an operation of the user.

Processing of Automatic Window Layout

Figure 8:
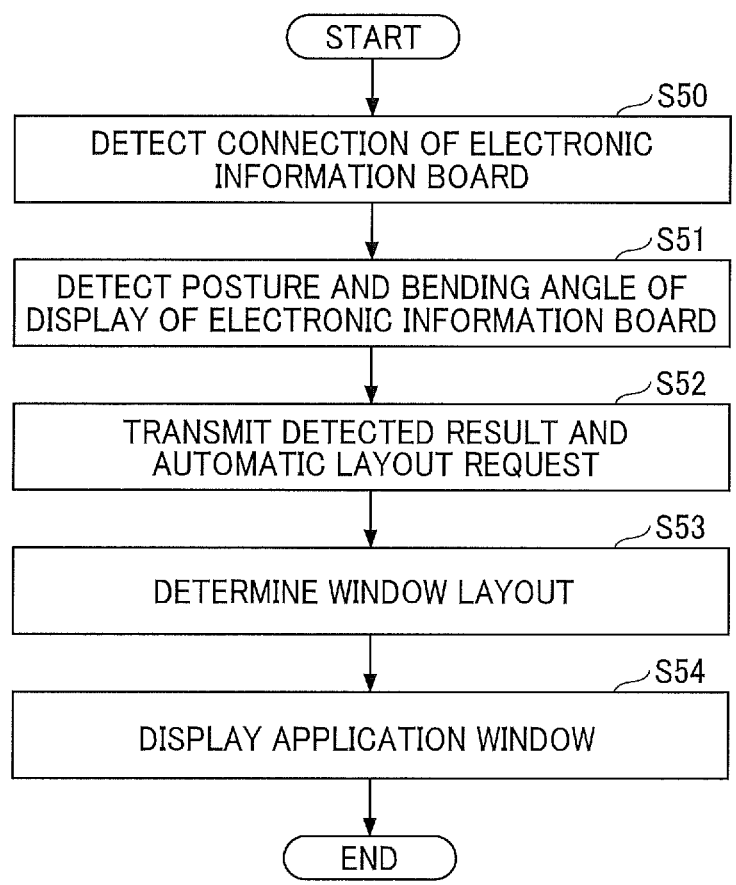
FIG. 8 is a flowchart illustrating an example of processing of arranging the application windows based on the window layout table according to the first embodiment of the present disclosure.

With reference to FIG. 8, a description is now given of processing performed by the information processing system 1 according to the first embodiment, when the electronic information board 3 is connected to the PC 5 (an example of the terminal device 2), to automatically determine a window layout without a selection by a user and perform a widow layout of one or more applications. FIG. 8 is a flowchart illustrating an example of processing of arranging the application windows based on the window layout table 40 according to the first embodiment of the present disclosure. A description is given below of the processing of S50 to S54.

In S50, the user connects the electronic information board 3 to the PC 5. The screen control application resident and operating in the PC 5 detects the connection of the electronic information board 3.

In S51, in a case where the electronic information board 3 recognizes the connection of the PC 5 to the electronic information board 3, the detection unit 31 detects the posture, inclination, and bending angle of the touch panel display 11. The detection unit 31 transmits the detection result and the request for automatically performing the window layout acquired from the first setting storing unit 34 to the first communication unit 32.

In S52, the first communication unit 32 of the electronic information board 3 transmits the detection result and the request for automatically performing the window layout to the second communication unit 22 of the terminal device 2. The second communication unit 22 transmits the detection result and the request for automatically performing the window layout received from the first communication unit 32 to the determination unit 21.

In S53, the determination unit 21 determines a window layout of one or more applications in accordance with the detection result received from the second communication unit 22 by referring to the window layout table 40 and transmits layout information indicating the determined result, to the second display control unit 23.

In S54, the second display control unit 23 displays, based on the layout information received from the determination unit 21, an application window on the display 506 of the PC 5 and transmits the window content information representing an image to be displayed on the touch panel display 11 of the electronic information board 3 to the second communication unit 22. The transmission of the window content information is performed by, for example, the following two methods.

One method is used in a case where the touch panel display 11 of the electronic information board 3 and the display of the PC 5 (the terminal device 2) are independently controlled for displaying images. The second display control unit 23 of the terminal device 2 transmits the window content information and the layout information of an individual application whose window to be displayed on the touch panel display 11 of the electronic information board 3 to the second communication unit 22. The layout information includes coordinates of diagonal vertices on the touch panel display 11 on which respective diagonal vertices of the window of the individual application are arranged. The second communication unit 22 transmits the window content information and the layout information received from the second display control unit 23 to the first communication unit 32 of the electronic information board 3. The first display control unit 33 displays the window of the individual application on the touch panel display 11 based on the layout information and the window content information received by the first communication unit 32.

The other method is used in a case where the touch panel display 11 of the electronic information board 3 can be regarded as an extended display of the PC 5. The second display control unit 23 regards the main screen and the sub screen to be one display area and arranges the window of the individual application based on the layout information. The second display control unit 23 causes a display I/F to output a video signal (image signal). The electronic information board 3 receives the video signal (image signal) from the display I/F and outputs the video signal (image signal) to the touch panel display 11 to cause the touch panel display 11 to display an image based on the video signal.

By performing the above-described processing, in a case where the electronic information board 3 is connected to the PC 5, the determination unit 21 of the PC 5 determines the window layout and generates the layout information based on the window layout table 40 in accordance with a posture, an inclination, and a bending angle of a display. In addition, the electronic information board 3 displays an application window on the touch panel display 11 based on the layout information and the window content information. Consequently, a user can use a video conference application at an appropriate angle of the camera 10 of the electronic information board 3 or use a whiteboard application at an angle that facilitates the user to input characters on the display.

Processing of Manual Layout Change and Setting Information Update by User

Figure 9:
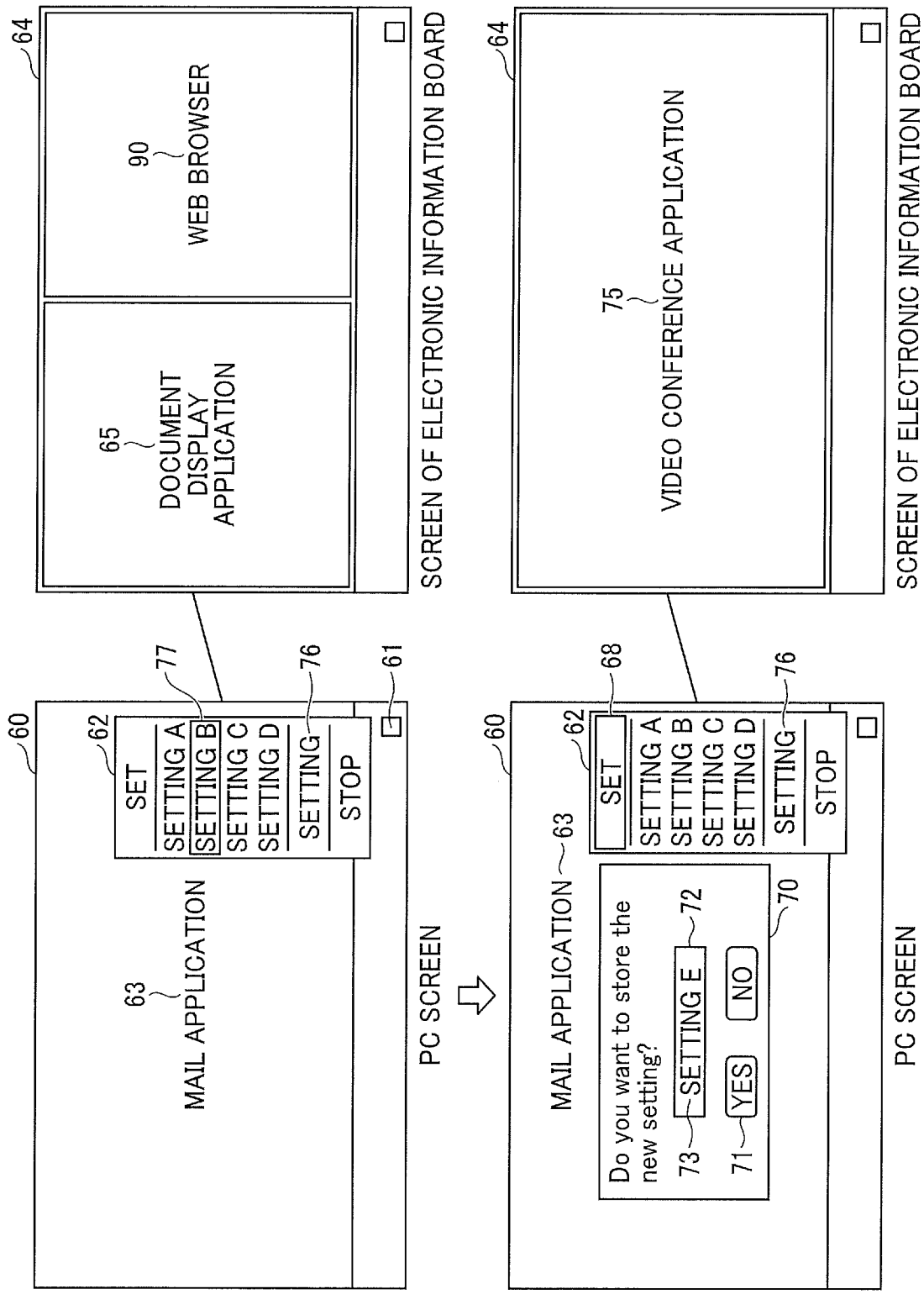
FIG. 9 is a diagram illustrating an example of a window layout and setting information update in accordance with user inputs according to one embodiment of the present disclosure.

With reference to FIG. 9, a description is now given of processing of performing a window layout in response to a manual selection of a user and processing of updating a window layout table (newly adding a setting) according to a user input. FIG. 9 is a diagram illustrating an example of a window layout and setting information update in accordance with user inputs, according to the present embodiment.

In the PC 5, the screen control application for managing the window layout table 40 is resident, i. e., constantly operating in the background. In a case where a user clicks an icon 61 displayed in a lower part of a screen 60 (the display 506) of the PC 5 with a mouse, the second display control unit 23 displays a setting screen 62. At this point, in a case where the user selects a section 77 ("SETTING B"), a window layout of the "SETTING B" of the window layout table 40 is applied. That is, since processing substantially similar to the processing of S54 in FIG. 8 is performed, a window of a mail application 63 is displayed on the screen 60 of the PC 5, and windows of a document display application 65 and a web browser 90 are displayed on a screen 64 (the touch panel display 11) of the electronic information board 3. In this manner, the user can freely select a setting of window layout to be performed by the information processing system 1, from the settings of the setting screen 62.

Further, it is assumed that the user newly adds a setting to the window layout table 40. When the user arranges a window of an individual application to be set and selects a section 68 ("SET") of the setting screen 62, the second display control unit 23 displays a pop-up screen. Then, the user clicks a section 71 ("YES"). A setting name 73 ("SETTING E") in a section 72 displaying the setting name may be automatically displayed or may be input by the user. In the example of FIG. 9, a window of the mail application 63 is arranged on the screen 60 of the PC 5, and a window of a video conference application 75 is arranged on the screen 64 of the electronic information board 3. Accordingly, the second setting storing unit 24 newly adds a setting of the current window layout to the window layout table 40 as "SETTING E."

Further, a setting of a window layout may be stored in units of windows of files opened by an application. For example, a setting of window layout specifying that windows of a "document file A.doc" and a "document file B.doc" are to be arranged in different areas is stored in the window layout table 40. In addition, in a case where the application is a web browser, settings of window layout may be stored in the window layout table 40 for individual uniform resource locators (URLs) distinguishably, or URLs may be undistinguished.

By performing the above-described processing, the information processing system 1 allows a user to change the setting of the window layout table 40.

Figure 10:
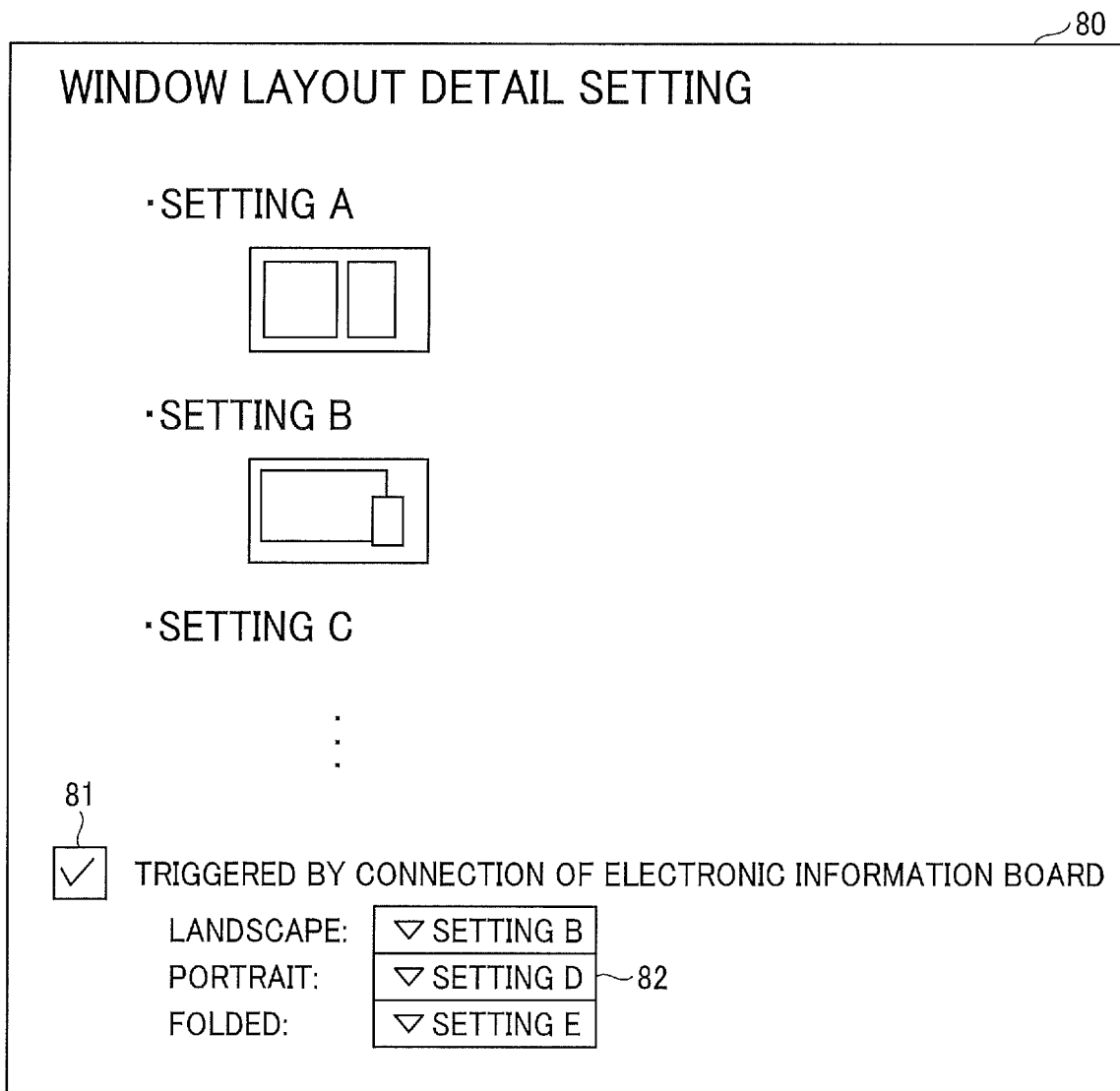
FIG. 10 is a diagram illustrating an example of a screen of window layout detail setting for a user to enable or disable an automatic window layout according to one embodiment of the present disclosure.

With reference to FIG. 10, a description is now given of processing in which the information processing system 1 receives a user input relating to a setting as to whether or not to automatically perform a window layout (enables or disables an automatic window layout) in a case where the electronic information board 3 is connected to the PC 5. FIG. 10 is a diagram illustrating an example of a screen of window layout detail setting for a user to enable or disable an automatic window layout according to the present embodiment. The screen of window layout detail setting is displayed, for example, by clicking a section 76 ("SETTING") in FIG. 9.

The user can check contents of the current setting, an application, and a window layout of the application with a window layout detail setting screen 80 displayed on the display of the PC 5. In addition, the user can enable or disable the automatic window layout by clicking an icon 81 in a lower part of the window layout detail setting screen 80. It is assumed that the user enables the automatic window layout. In this case, when the electronic information board 3 is connected to the PC 5, the window layout is automatically performed with the connection as a trigger. The information of setting as to whether or not to automatically perform the window layout is stored in the first setting storing unit 34 of the electronic information board 3. It is assumed that the user disables the automatic window layout. In this case, when the electronic information board 3 is connected to the PC 5, the electronic information board 3 does not transmit a request for automatically performing the window layout to the PC 5.

The user can also set the window layout to be performed for each posture of the electronic information board 3 in a screen 82 for selecting a setting of the window layout in a case where the electronic information board 3 is connected to the PC 5. Further, the user may change a name of a setting or delete a setting on the window layout detail setting screen 80. Furthermore, conditions may be defined such that, for example, up to five settings can be stored, or the number of application windows in one setting is up to "N" or is not limited. Here, the "N" is an integer equal to or greater than one.

It is assumed that the PC 5 fails to arrange an application window based on the window layout information at a time of start-up of the PC 5 since a display such as the electronic information board 3 is not connected or the resolution of the electronic information board 3 is changed. In such a case, the application window may be arranged with reference to the upper left corner of the screen (main screen) of the PC 5. In such a case, the sub screen is not used.

In addition, in a case where an application has already been activated, the screen control application resident in the PC 5 may change the layout of the window of the activated application without doubly activating the same application. Further, the screen control application may automatically perform a window layout by aggregating a usage status of the window layout of the user.

By performing the above-described operation, a user can enable or disable the automatic window layout.

While some embodiments of the present disclosure have been described, the present disclosure is not limited to such embodiments and may be modified and substituted in various ways without departing from the spirit of the present disclosure.

For example, in the example of the functional configuration of the block diagram illustrated in FIG. 4, functional units are divided in accordance with main functions to facilitate understanding of the processing performed by the terminal device 2 and the electronic information board 3. Each processing unit or each specific name of the processing unit is not to limit a scope of the present disclosure. The processing implemented by the terminal device 2 and the electronic information board 3 may be divided into a larger number of processing units depending on the content of the processing. In addition, a single processing unit can be divided to include a larger number of processing units. The PC 5 is merely one example of the terminal device 2. In another example, a smartphone or a tablet terminal may be used.

Examples of the display device include, but are not limited to, a liquid crystal display (LCD), a plasma display, an electrophoretic display, an organic electro-luminescence display (OLED), a mini light emitting diode (LED) display, and a micro LED display. Examples of the method of the touch panel include various methods such as a resistance film method, a capacitance method, and a method using an ultrasonic wave, an infrared ray, or an electromagnetic induction, but are not limited thereto.

Each function of the embodiments described above may be implemented by one processing circuit or a plurality of processing circuits. Here, the "processing circuit or circuitry" in the present specification includes a programmed processor to execute each function by software, such as a processor implemented by an electronic circuit, and devices, such as an application specific integrated circuit (ASIC), a digital signal processor (DSP), a field programmable gate array (FPGA), and conventional circuit modules arranged to perform the recited functions.

In addition, as long as a device implementing each functional unit can be identified, the notations of the "first" and the "second" may be omitted for the first communication unit 32, the second communication unit 22, the first display control unit 33, the second display control unit 23, the first setting storing unit 34, the second setting storing unit 24, the first operation receiving unit 35, and the second operation receiving unit 25.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone such as a wireless application protocol (WAP) or third-generation (3G)-compliant phone, and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, a compact disc read only memory (CD-ROM), magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

One aspect of the present disclosure provides a first non-transitory recording medium storing a plurality of program codes which, when executed by one or more processors of an information processing apparatus that displays a screen on a display, causes the processors to perform a method. The method includes transmitting a detection result indicating at least one of a posture, an inclination, and a bending angle of the display to a terminal device capable of executing one or more applications, receiving layout information of the applications determined based on the detection result transmitted from the terminal device and content information of the applications, and displaying one or more windows of the applications on the display based on the layout information and the content information received from the terminal device.

Another aspect provides a second non-transitory recording medium storing a plurality of program codes which, when executed by one or more processors of a terminal device capable of executing one or more applications, causes the processors to perform a method. The method includes receiving a detection result indicating at least one of a posture, an inclination, and a bending angle of a display of an information processing apparatus from the information processing apparatus, determining, based on the detection result, a layout of one or more windows of the applications corresponding to the detection result transmitted from the information processing apparatus to generate the layout information, and transmitting the layout information to the information processing apparatus.

The invention claimed is:

1. An information processing system comprising:
an information processing apparatus including a display; and
a terminal device configured to execute one or more applications,
the information processing apparatus including first circuitry configured to:
transmit a detection result indicating a posture, an inclination, and a bending angle of the display to the terminal device;
receive layout information of the applications and content information of the applications from the terminal device; and
display one or more windows of the applications on the display based on the layout information and the content information received from the terminal device,
the terminal device including second circuitry configured to:
determine where the one or more windows of the applications are arranged based on a layout table in which a layout of the one or more windows of the applications corresponding to the detection result is set in advance to generate the layout information; and
transmit the layout information to the information processing apparatus.

2. The information processing system according to claim 1, wherein:
the one or more applications include a plurality of different applications;
the bending angle indicates that the display is folded along a folding line with the bending angle; and
the second circuitry of the terminal device is configured to generate the layout information for arranging at least two windows of the plurality of different applications respectively in a plurality of areas of the display, divided by the folding line.

3. The information processing system according to claim 1, wherein:
the one or more applications include a plurality of different applications; and
the second circuitry of the terminal device is configured to generate the layout information for arranging the one or more windows of the plurality of different applications in different areas of the display, according to the inclination of the display.

4. The information processing system according to claim 3, wherein the second circuitry of the terminal device is configured to generate the layout information for arranging the one or more windows of the plurality of different applications according to the posture of the display, based on information associating the layout and the posture of the display for the same inclination of the display.

5. The information processing system according to claim 1, wherein the layout information indicates that a display of the terminal device is one of destinations where the one or more windows of the applications are to be arranged.

6. The information processing system according to claim 1, wherein the detection result is associated with a plurality of destinations where the one or more windows of the applications are to be arranged in the layout table, the plurality of destinations including the display of the information processing apparatus and a display of the terminal device.

7. The information processing system according to claim 1, wherein the second circuitry of the terminal device is further configured to receive an operation of a user to change a setting of the layout table.

8. The information processing system according to claim 1, wherein the second circuitry of the terminal device is configured to receive an input by a user indicating whether to automatically generate the layout information in a case where the information processing apparatus and the terminal device are connected to each other.

9. The information processing system according to claim 1, wherein:
the first circuitry of the information processing apparatus is configured to display the one or more windows of the applications on the display based on a video signal output from the terminal device; and
the second circuitry of the terminal device is further configured to regard the display of the terminal device and the display of the information processing apparatus to be one display area and generate the video signal for displaying the one or more windows of the applications on the one display area based on the determined layout information.

10. An information processing apparatus comprising:
a display; and
circuitry configured to transmit a detection result indicating a posture, an inclination, and a bending angle of the display to a terminal device capable of executing one or more applications, receive layout information of the applications and content information of the applications, the layout information being generated by determining where one or more windows of the applications are arranged based on a layout table in which a layout of the one or more windows of the applications corresponding to the detection result is set in advance, and display the one or more windows of the applications on the display based on the layout information and the content information received from the terminal device.

11. A terminal device comprising circuitry, the circuitry configured to:

execute one or more applications;

determine where one or more windows of the applications are arranged based on a layout table in which a layout of the one or more windows of the applications corresponding to a detection result transmitted from an information processing apparatus is set in advance to generate layout information, the detection result indicating a posture, an inclination, and a bending angle of a display of the information processing apparatus; and transmit the layout information and content information of the applications to the information processing apparatus.

12. A display method performed by an information processing apparatus that displays a screen on a display, the method comprising:

transmitting a detection result indicating a posture, an inclination, and a bending angle of the display to a terminal device capable of executing one or more applications;

determining where one or more windows of the applications are arranged based on a layout table in which a layout of the one or more windows of the applications corresponding to the detection result is set in advance to generate layout information;

receiving the layout information of the applications corresponding to the detection result transmitted from the terminal device and content information of the applications; and displaying the one or more windows of the applications on the display based on the layout information and the content information.

13. The information processing system according to claim 1, wherein:

the second circuitry of the terminal device is configured to determine where the one or more windows of the applications are arranged based on the layout table, without a selection by a user, when the information processing apparatus is connected to the terminal device.

14. The information processing system according to claim 1, wherein:

the layout of the one or more windows of the applications includes a layout on the terminal device as a main screen and the information processing apparatus as sub screens.

15. The information processing system according to claim 14, wherein:

the determining includes determining a number of the sub screens of the information processing apparatus.

* * * * *